(12) United States Patent
Swatek et al.

(10) Patent No.: US 8,664,511 B2
(45) Date of Patent: Mar. 4, 2014

(54) SOLAR MODULE

(75) Inventors: Alexander Swatek, St. Michael (AT); Christoph Schöndorfer, Brunnenthal (AT); Elmar Stöger, Bad Erlach (AT)

(73) Assignee: Smart Flower Energy Technology GmbH, Gussing (AT)

( * ) Notice: Subject to any disclaimer, the term of this patent is extended or adjusted under 35 U.S.C. 154(b) by 271 days.

(21) Appl. No.: 13/168,164

(22) Filed: Jun. 24, 2011

(65) Prior Publication Data

US 2011/0315192 A1    Dec. 29, 2011

(30) Foreign Application Priority Data

Jun. 29, 2010    (AT) .................................. A 1097/2010

(51) Int. Cl.
*H01L 31/042*    (2006.01)

(52) U.S. Cl.
USPC ........... 136/244; 136/243; 136/245; 136/251; 248/176.1; 248/125.1; 126/627

(58) Field of Classification Search
CPC ... H01L 31/045; H01L 31/0422; H01L 31/42; H01L 31/02021
USPC ........ 52/173.3, 79.5; 136/243, 244, 245, 246, 136/251; 248/176.1, 121, 125.1, 125.7, 248/125.9; 126/627; 244/172.7, 172.8, 244/172.9, 176.6; 320/101
See application file for complete search history.

(56) References Cited

U.S. PATENT DOCUMENTS

| | | | | |
|---|---|---|---|---|
| 2,471,828 A | * | 5/1949 | Mautner | 343/916 |
| 3,377,595 A | | 4/1968 | Carr et al. | |
| 4,030,102 A | * | 6/1977 | Kaplan et al. | 343/915 |
| 4,527,362 A | * | 7/1985 | Tobey et al. | 52/71 |
| 4,552,438 A | * | 11/1985 | Murphy | 359/847 |
| 4,811,034 A | * | 3/1989 | Kaminskas | 343/915 |
| 5,027,892 A | * | 7/1991 | Bannon et al. | 165/41 |
| 5,090,399 A | * | 2/1992 | Tarcici | 126/682 |
| 5,257,034 A | * | 10/1993 | Turner et al. | 343/915 |
| 5,296,044 A | * | 3/1994 | Harvey et al. | 136/245 |
| 5,524,610 A | * | 6/1996 | Clark | 126/682 |
| 5,527,001 A | * | 6/1996 | Stuart | 244/159.4 |

(Continued)

FOREIGN PATENT DOCUMENTS

| | | |
|---|---|---|
| CN | 2893950 | 4/2007 |
| CN | 201252107 | 6/2009 |

(Continued)

OTHER PUBLICATIONS

Austrian Search Report dated Feb. 14, 2011.

(Continued)

*Primary Examiner* — Robert Canfield
*Assistant Examiner* — Matthew Gitlin
(74) *Attorney, Agent, or Firm* — Hoffmann & Baron, LLP (57) ABSTRACT

Solar module with a plurality of lamellar solar panels, which are mounted on an elongated support to pivot around a common axis and are movable between a first position in which they are superposed to be substantially congruent and parallel to the support, and a second position in which, opened out in a fan formation, they lie substantially adjacent to one another around the said axis, wherein the support can be extended via a closable opening out of a housing, which receives it with the solar panels in the first position.

23 Claims, 6 Drawing Sheets

(56) References Cited

U.S. PATENT DOCUMENTS

| | | | |
|---|---|---|---|
| 5,898,529 A * | 4/1999 | Meyer et al. | 359/853 |
| 5,969,501 A * | 10/1999 | Glidden et al. | 320/101 |
| 6,353,421 B1 * | 3/2002 | Lalezari et al. | 343/915 |
| 6,376,764 B1 | 4/2002 | Luo | |
| 6,396,239 B1 * | 5/2002 | Benn et al. | 320/101 |
| 6,504,345 B2 * | 1/2003 | Sakurai et al. | 320/162 |
| 7,026,541 B2 * | 4/2006 | Heidrich | 136/251 |
| 7,138,960 B2 * | 11/2006 | Carroll et al. | 343/882 |
| 7,230,819 B2 * | 6/2007 | Muchow et al. | 361/601 |
| 7,755,564 B2 * | 7/2010 | Gonzalez et al. | 343/915 |
| 7,872,614 B2 * | 1/2011 | Gonzalez et al. | 343/915 |
| 8,168,883 B2 * | 5/2012 | Clark | 136/245 |
| 8,230,685 B2 * | 7/2012 | Lin | 60/641.8 |
| 2003/0015625 A1 | 1/2003 | McGee et al. | |
| 2004/0069341 A1 | 4/2004 | Heidrich | |
| 2006/0137348 A1 * | 6/2006 | Pas | 60/641.1 |
| 2009/0007959 A1 | 1/2009 | Wu et al. | |
| 2009/0126775 A1 | 5/2009 | White et al. | |
| 2009/0165841 A1 * | 7/2009 | Gunn et al. | 136/245 |
| 2009/0293933 A1 | 12/2009 | Clark | |
| 2010/0000592 A1 | 1/2010 | Ko | |
| 2010/0071684 A1 * | 3/2010 | Cowan et al. | 126/605 |
| 2011/0049992 A1 * | 3/2011 | Sant'Anselmo et al. | 307/64 |
| 2011/0146751 A1 * | 6/2011 | McGuire et al. | 136/245 |
| 2011/0179791 A1 * | 7/2011 | Butler et al. | 60/641.15 |
| 2011/0253193 A1 * | 10/2011 | Korman et al. | 136/245 |
| 2011/0277748 A1 * | 11/2011 | Chu | 126/627 |
| 2012/0313569 A1 * | 12/2012 | Curran | 320/101 |
| 2013/0082637 A1 * | 4/2013 | Eaton et al. | 320/101 |

FOREIGN PATENT DOCUMENTS

| | | |
|---|---|---|
| DE | 29501583 U1 | 5/1995 |
| DE | 10062607 A1 | 6/2001 |
| DE | 2009022610 A1 | 12/2009 |
| EP | 1885038 | 2/2008 |
| JP | 10270729 | 10/1998 |

OTHER PUBLICATIONS

International Preliminary Report on Patentability for PCT/AT2011/000249 dated Jan. 17, 2013.
International Search Report for PCT/AT2011/000249 dated Apr. 4, 2012.
Written Opinion of the ISA for PCT/AT2011/000249 dated Apr. 4, 2012.

* cited by examiner

SOLAR MODULE

CLAIM OF PRIORITY

The present application claims the priority of Austrian patent application No. A 1097/2010 filed Jun. 29, 2010 the entire contents of which is herein incorporated by reference. Copending is International Patent Application No. PCT/AT 2011/000249 filed Jun. 1, 2011 and claiming the same priority.

FIELD OF THE INVENTION

The present invention relates to a solar module with a plurality of lamellar solar panels, which are mounted on an elongated support to pivot around a common axis and are movable between a first position in which they are superposed to be substantially congruent and parallel to the support, and a second position in which, opened out in a fan formation, they lie substantially adjacent to one another around the said axis.

BACKGROUND

Solar modules of this type are known, for example, from patent documents US 2004/0069341 A1, EP 1 885 038 A1, CN 2893950 Y or CN 201252107 Y and are used for mobile supply of small electrical devices such as mobile telephones, laptops etc. The known devices are designed as hand-held or desk top devices, wherein the solar panels can be opened out in the manner of a fan and closed up for transport purposes.

The aim of the invention in respect of this is to provide a solar module that is suitable for stationary use in the open, e.g. as power supply assembly for a family home.

SUMMARY

This aim is achieved with a solar module of the aforementioned type, which is distinguished according to the invention in that the support can be extended via a closable opening out of a housing, which receives it with the solar panels in the first position. In this way, the sensitive solar panels can be retracted at night or in bad weather, e.g. strong winds, lightning, hail or heavy rain, to protect it from damage.

More specifically, the present invention is a solar module which includes a housing with a closable opening. An elongated support is mounted in the housing. A plurality of lamellar solar panels are mounted on the support to pivot around a common axis and are movable between a first position in which they are superposed to be substantially congruent to one another and parallel to the support, and a second position in which, opened out in a fan formation, the panels lie substantially adjacent to one another around said common axis. Furthermore, the support can be extended from a retracted position in which it is received with the solar panels in the first position within said housing, via said opening out of said housing into an extended position in which the solar panels can be moved between their first and second positions.

The housing preferably has the shape of a shallow box with the said opening lying on the upper side thereof, wherein the support is mounted to pivot in the housing and in the retracted position lies parallel to and below the upper side and in the extended position is pivoted through the opening. As a result, the solar module according to the invention has a low installation depth, which benefits its installation into the ground or a building facade or covering.

In one embodiment, the housing forms a sealed tank for installation into the ground to be flush on the upper side, so that in the refracted resting position the solar panels are protected on all sides, including against soil moisture.

In an alternative embodiment, the housing is fitted with elements for installation into a building facade or a building roof to be flush on the upper side, as a result of which existing building surfaces can be used to produce energy.

According to a further feature of the invention, the opening is closable with at least one cover that slides approximately parallel to the upper side of the housing. Such a cover configuration requires little space for opening and does not hinder the extension and movements of the solar panels in open state.

It is particularly favorable if the cover forms a shallow plantable tank, as a result of which the solar module can be integrated into a garden area or green space in an inconspicuous and protected manner. The planting of the cover simultaneously forms a thermal insulation.

According to a further advantageous configuration of the invention, at least one solar panel is fitted on its rear side with a sweeping lip, which slides along the solar panel below it when opening out in a fan formation. A self-cleaning solar module, as it were, can be created in this way: when opening out in a fan formation—and also during the reverse movement—the sweeping lip of one solar panel cleans dust, snow, rain, leaves etc. off the surface of the adjacent solar module, so that an optimum performance of the solar panels is maintained throughout the entire year even in changing weather conditions. Preferably, all the solar panels are provided with such a sweeping lip except for the lowest one.

For the same purpose, according to a further feature of the invention it can be provided that the opening of the housing is fitted with a sweeping lip, which slides along the uppermost of the superposed solar panels during extension of the support, as a result of which the uppermost solar panel is also cleaned automatically.

Alternatively, this cleaning function can be achieved by fitting the cover with a sweeping lip, which slides along the uppermost of the superposed solar panels when it is opened.

In any case, it is particularly favorable if at its one end the support has a pivot head for mounting the solar panels. As a result, in the opened out position the solar panels can be oriented exactly to the sun. For this, it is preferably provided that the support and/or the pivot head, if there is one present, is/are fitted with a solar altitude-controlled drive for automatic solar tracking of the solar panels to constantly achieve optimum efficiency during the course of a day or a year.

In principle, the solar panels could be manually extended out of the housing and opened out into a fan formation and in reverse. However, it is particularly advantageous if the solar panels are movable between their positions by means of an electric drive and the support is retractable and extensible by means of an electric drive, so that the operation of the solar module can be automated. In this way, for example, the solar panels can be automatically extended and opened out in a fan formation when there is sufficient sunlight and reliable weather, and be automatically closed up and retracted during darkness or bad weather.

The electric drives preferably have worm drives, which engage in toothed rings of the driven axes, and this results in spaced-saving drives with high gear reduction between motor speed and output speed.

In principle, the solar panels can be of any desired type known in the prior art, which allows a conversion of sunlight into usable energy, e.g. with heat transfer fluids circulating in the solar panels that are heated by sunlight. However, each solar panel is preferably formed by a planar array of photovoltaic solar cells to generate electric energy directly. This also facilitates the interconnection of the solar panels and their connection to the support or the pivot head, since only electrical connections must be created here.

BRIEF DESCRIPTION OF THE DRAWINGS

The invention is explained in more detail below on the basis of an exemplary embodiment represented in the attached drawings.

DETAILED DESCRIPTION

Figure 1:
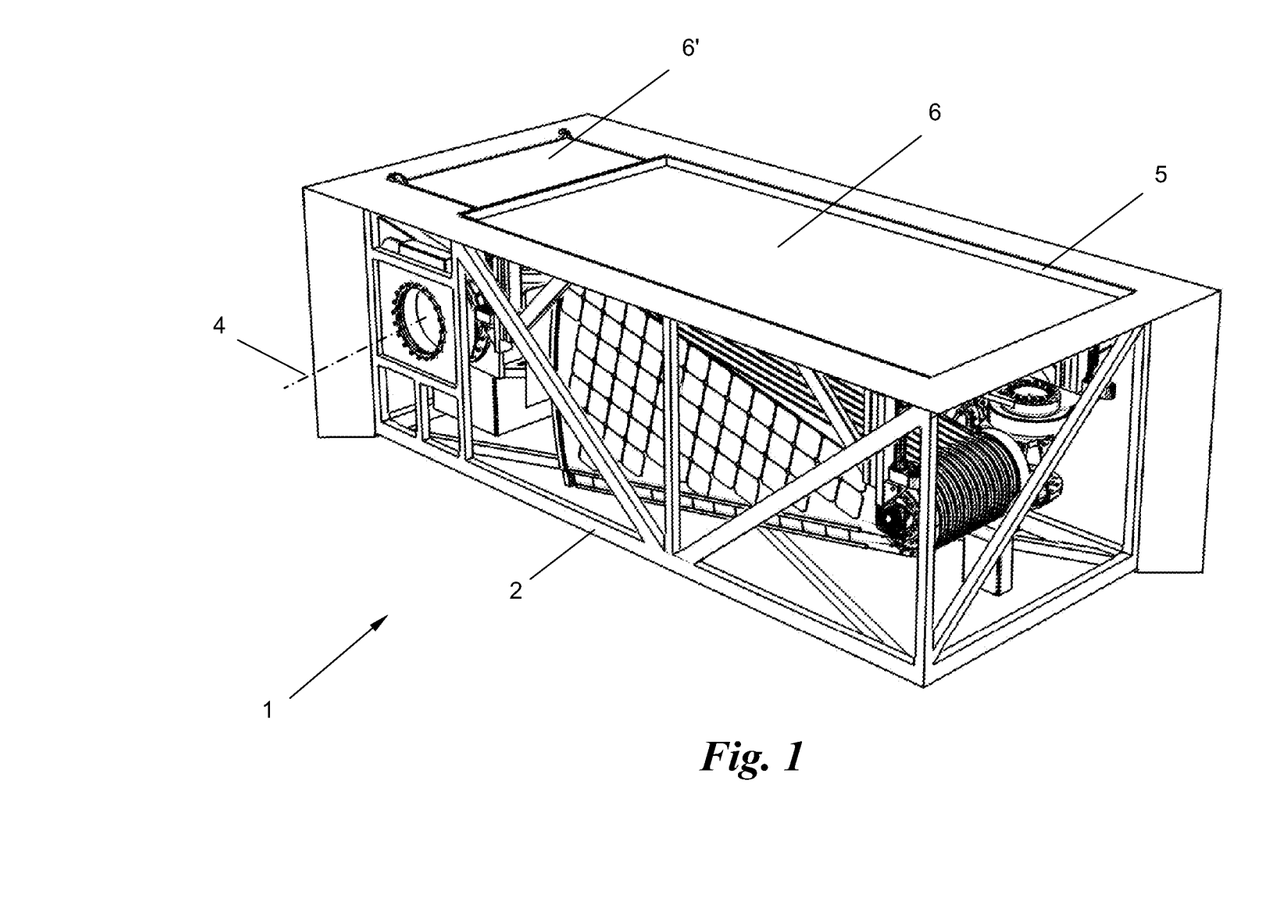
FIG. 1 is a perspective view of the solar module of the invention in the closed and retracted position.
Figure 2:
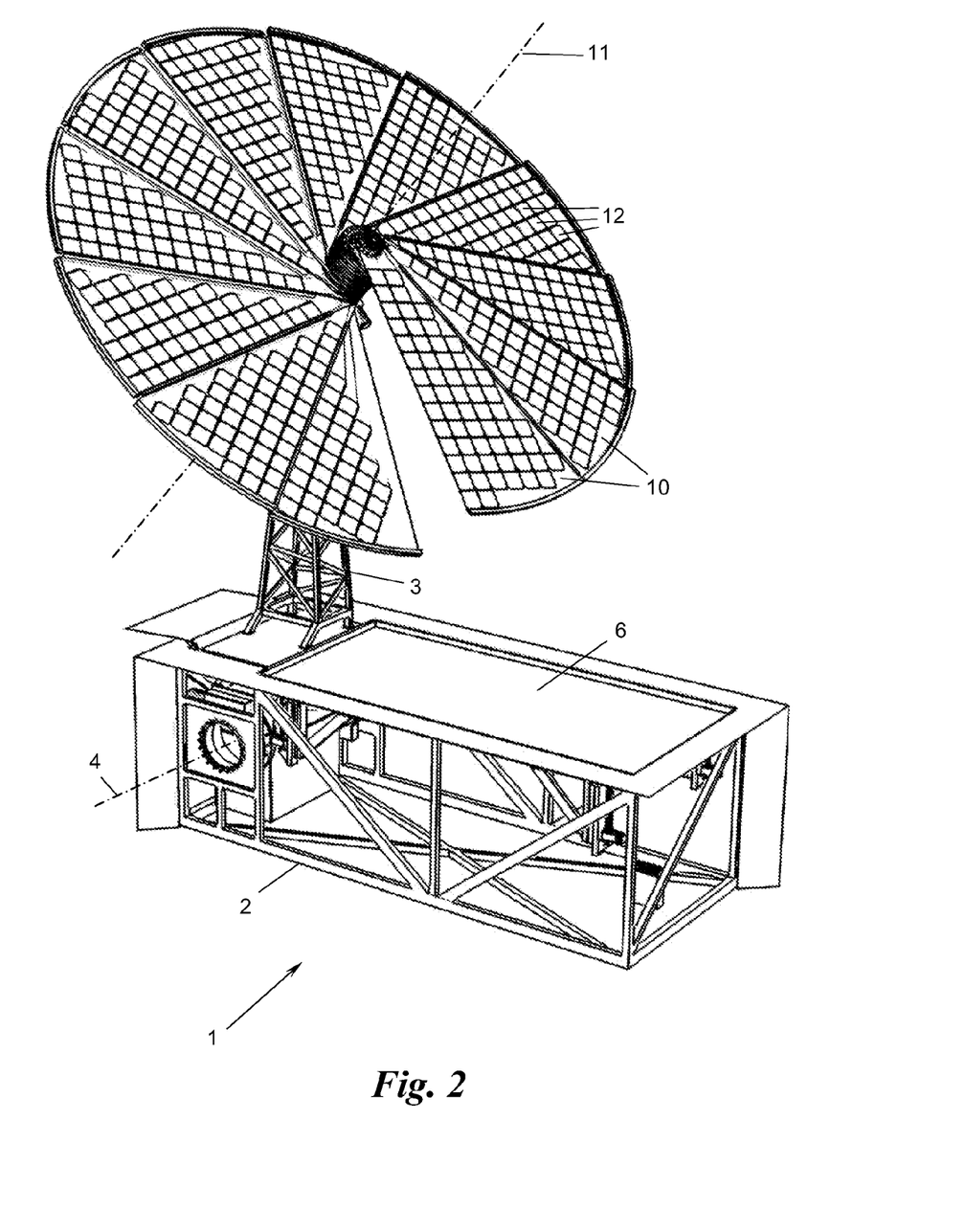
FIG. 2 is a perspective view of the solar module of the invention in the opened out and extended position.

According to FIGS. 1 to 3, a solar module 1 comprises a housing 2, in which an elongated support 3 is mounted to pivot around an axis 4. The housing 2 has approximately the shape of a shallow box and in the shown example is configured in the form of a latticework frame. On its upper side the housing 2 has an opening 5, through which the support 3 is pivoted during extension and retraction (see FIG. 3c). More specifically, the support 3 can be extended from a retracted position to an extended position exposing the solar panels 10. In the refracted position, the solar panels 10 are in a first storage position.

The opening 5 is closed with at least one cover 6, which can be folded open during extension of the support 3 or, as in the shown example, can be slid away sidewise. For this purpose, the cover 6 is mounted to slide on guide rails 7 (see FIG. 3b), which can in turn be raised slightly above the upper side of the housing 2 by means of linear guides 8 (FIG. 3a) so that the cover 6 can slide laterally past the edge of the housing 2.

Figure 3A:
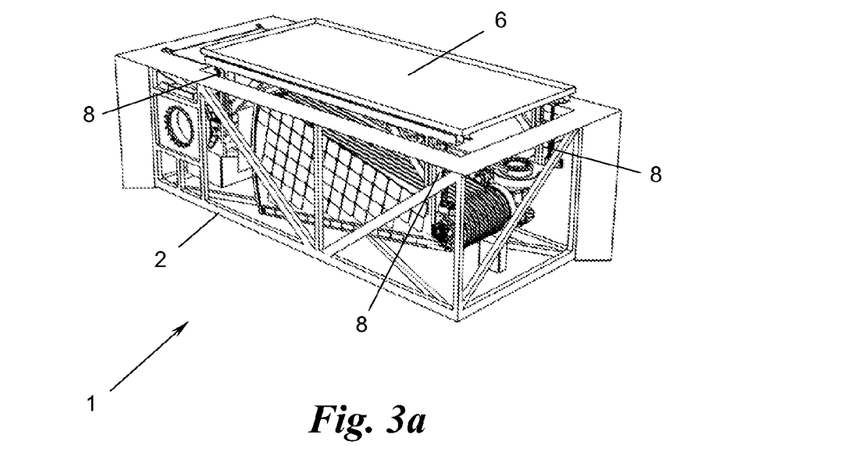
FIGS. 3a to 3f are perspective views of the solar module of the invention in consecutive phases of extension of the support and opening out of the solar panels in fan formation.
Figure 3B:
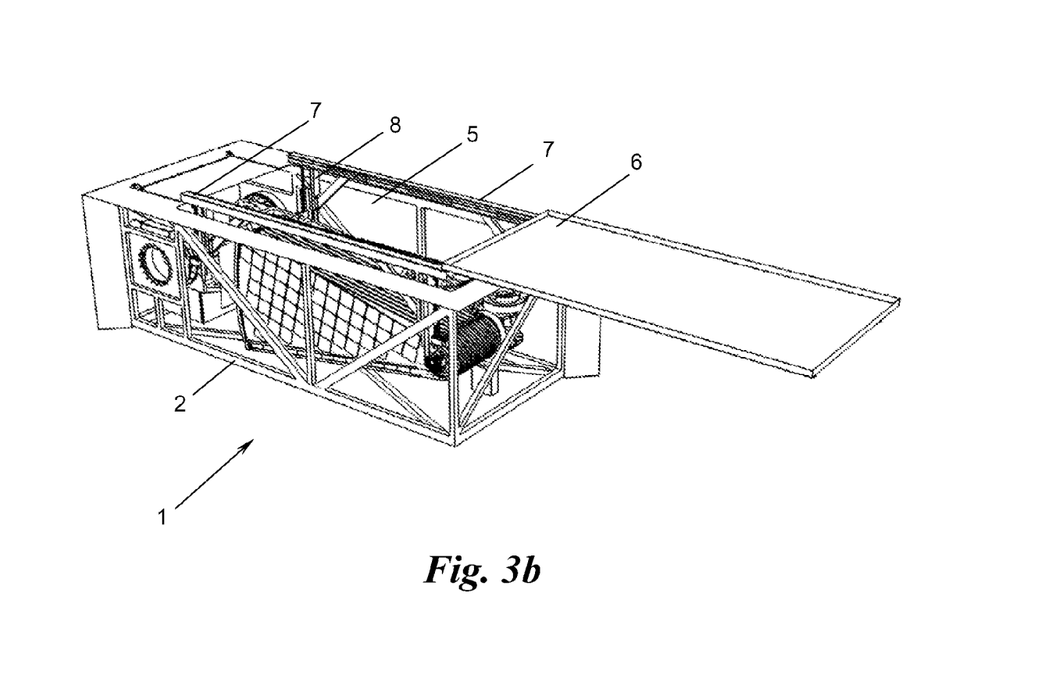
Figure 3C:
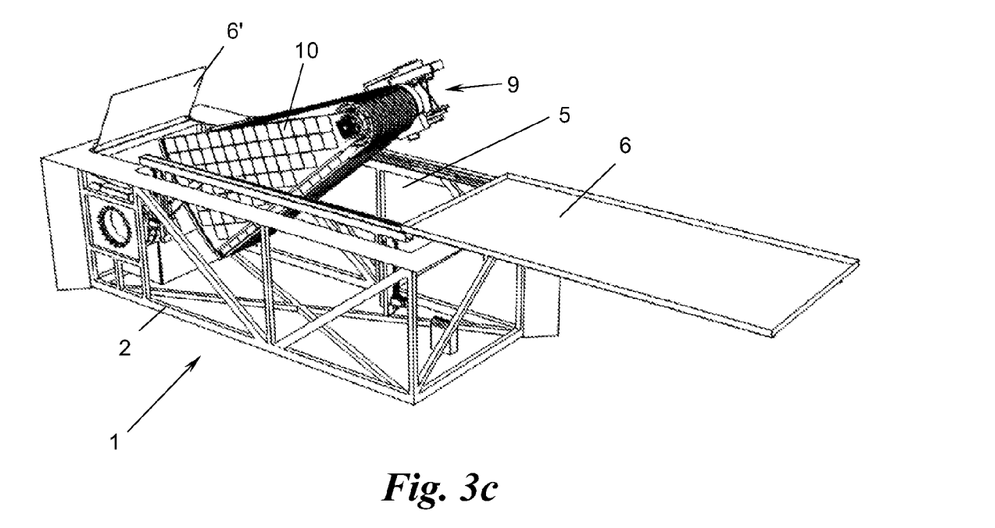
Figure 3D:
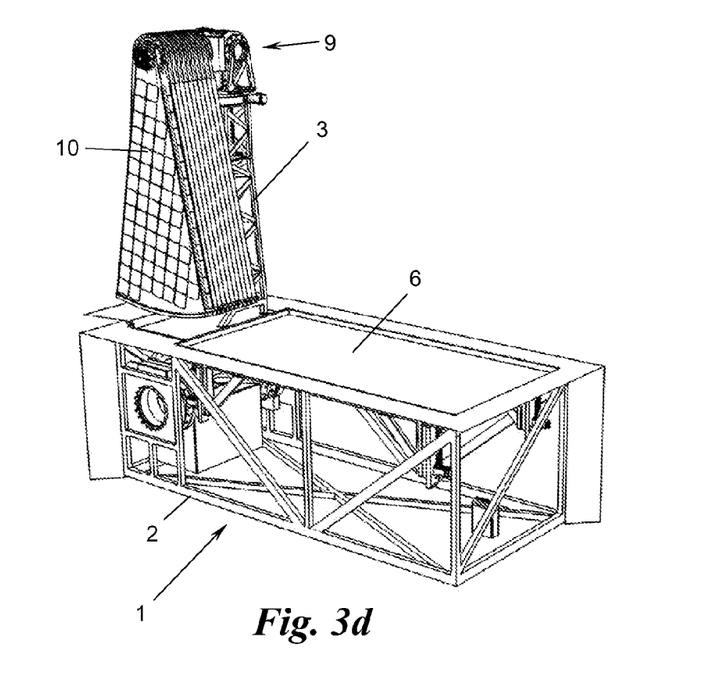
Figure 3E:
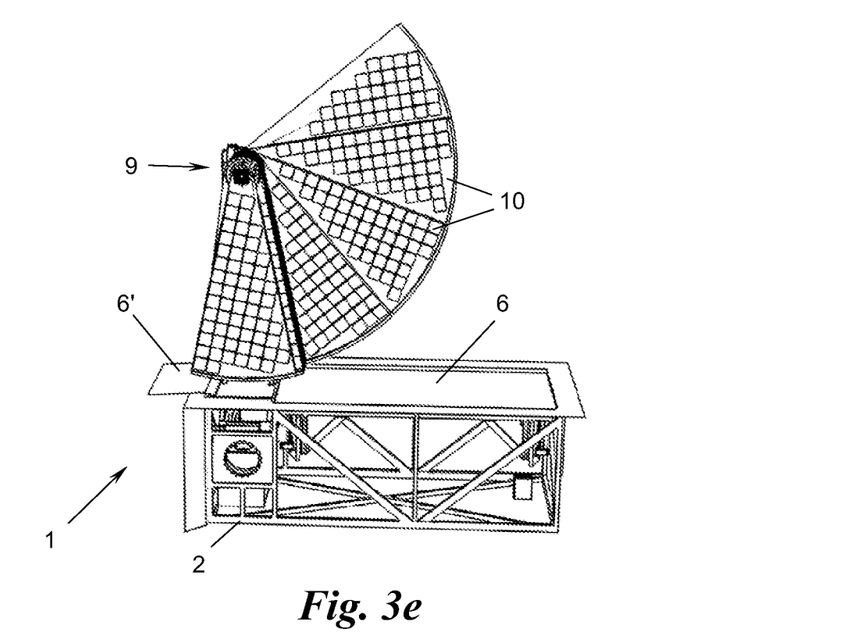
Figure 3F:
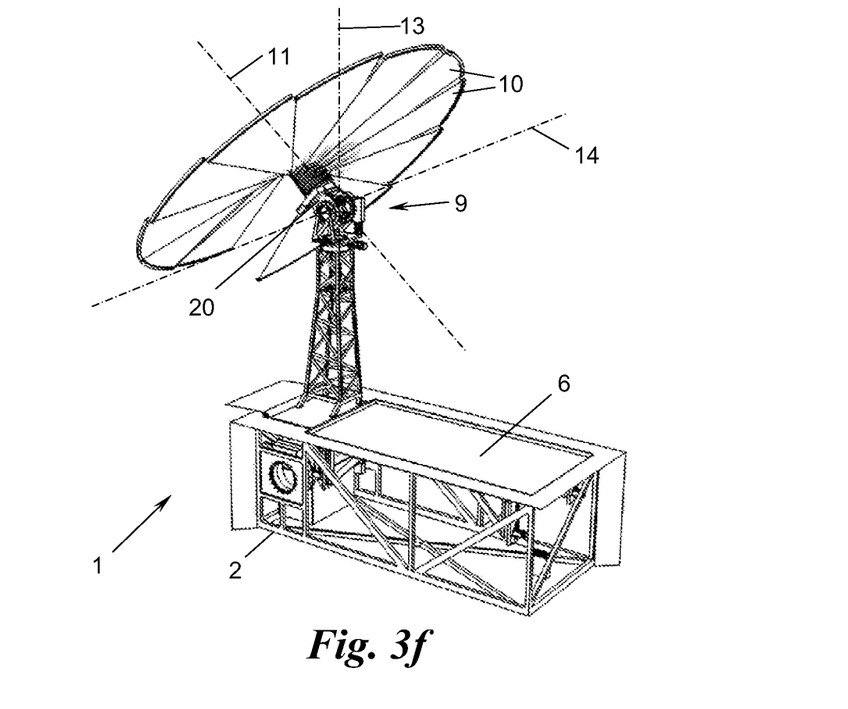

After the support 3 has been pivoted out completely, the cover 6 can slide back into place again (FIG. 3d). An auxiliary cover 6' that has closed the opening 5 at the location where the support 3 passes through in the extended state can stand folded open in this position. The solar panels 10 may then be opened out in fan formation. (FIG. 3f).

The housing 2 can be installed into the ground, a building facade or a building roof so that it is flush on its upper side. When installed into the ground the housing 2 is preferably configured as a sealed tank to protect against soil moisture. The cover 6 can form a shallow plantable tank so that the solar module 1 can be integrated into a green space.

For the flush installation into a building facade or into a house roof, the housing 2 can be provided with connection parts for flush anchorage in a corresponding opening of the facade or roof, e.g. with fastening straps or flanges (not shown).

On the end opposite its bearing axis 4 the support 3 has a pivot head 9 for the adjustable mounting of a set of lamellar solar panels 10. The solar panels 10 can be mounted on the support 3, more precisely on its pivot head 9, to pivot around a common axis 11 and in this way can be moved from a first position, see FIG. 1 and FIGS. 3a-d, in which they are superposed to be substantially congruent and parallel to the support 3, into a second position in which they are opened out in a fan formation around the axis 11 and thus lie substantially adjacent to one another, see FIGS. 2 and 3f, and in reverse. As may be seen, the solar panels 10 are preferably in the shape of sectors of a circle, so that they form a full circle together when opened out in fan formation.

In the shown example, each solar panel 10 is formed by a planar array of photovoltaic solar cells 12. The electrical connections or circuit connections of the solar cells 12 and solar panels 10 are not shown for reasons of clarity. For example, the solar panels 10 can be connected by means of flexible connection cables or sliding contacts and rigid contact rings on the pivot head 9 and connected to the further electric power transmission system.

The pivot head 9 is mounted on the support 3 to pivot around a vertical axis 13 and around a horizontal axis 14, so that the axis 11 or the solar panels 10 can be optimally oriented to the sun. For this purpose, a drive controlled by corresponding solar altitude sensors (not shown) can also be provided for the solar panels 10 to automatically track the sun, e.g. by means of actuators, which align the pivot head 9 in its rotational axes 13, 14.

These actuators can be worm drives driven by electric motor, for example, which act on toothed rings coupled to the axes 13, 14. Worm drives of the same type are preferably also used for pivoting the support 3 in and out and for opening and closing the solar panels 10 in fan formation.

Figure 4:
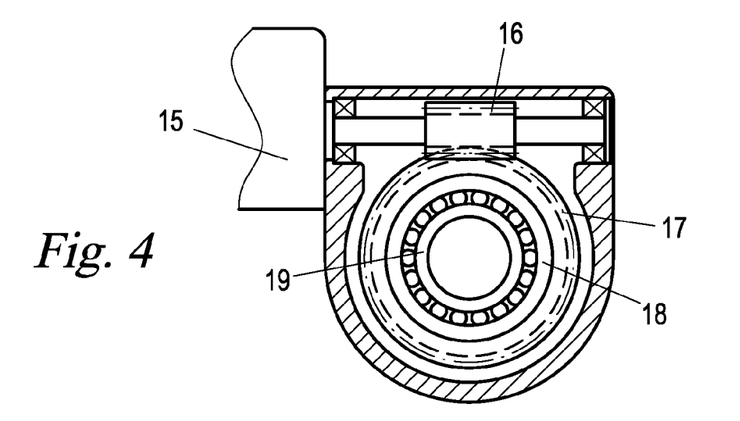
FIG. 4 is a side view of one of the drives of the solar module.
Figure 5:
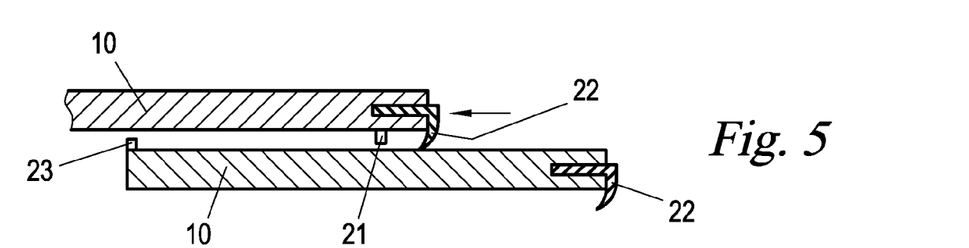
FIG. 5 shows a section through two superposed solar panels to illustrate the sweeping lip between these.

FIG. 4 shows one of these drives in detail. An electric motor 15 drives a worm 16 that engages into a toothed ring 17 coupled directly to one part 18 of a ball bearing, its other part 19 being fixedly mounted. The part 18 is coupled to the respective component to be driven, such as the support 3 in relation to the housing 2, the pivot head 9 in relation to the support 3, a bearing part 20 of the pivot head 9 for the solar panels 10 in relation to the rest of the pivot head 9, or the solar panels 10 in relation to the bearing part 20. To open the solar panels 10 in fan formation around the axis 11 it is sufficient to only drive the uppermost or lowest solar panel 10, for example, if each solar panel 10 entrains the solar panel 10 lying below or above it by means of entrainment hooks or bars 21 (FIG. 5).

The sliding of the solar panels 10 over one another during this entrainment movement can be used for cleaning the solar panels 10. For this purpose, according to FIG. 5, each solar panel 10 (except for the lowest solar panel 10) is fitted on its rear side with a sweeping lip 22, which sweeps over the solar panel 10 respectively located below it during the opening in fan formation. The sweeping lip 22 can be a rubber lip or a brush lip, for example.

The sweeping lip 22 can at the same time form the entrainment bar 21. At the end of its movement over the solar panel 10 lying below it the entrainment bar 21 strikes against a stop bar 23 of the solar panel.

Figure 6:
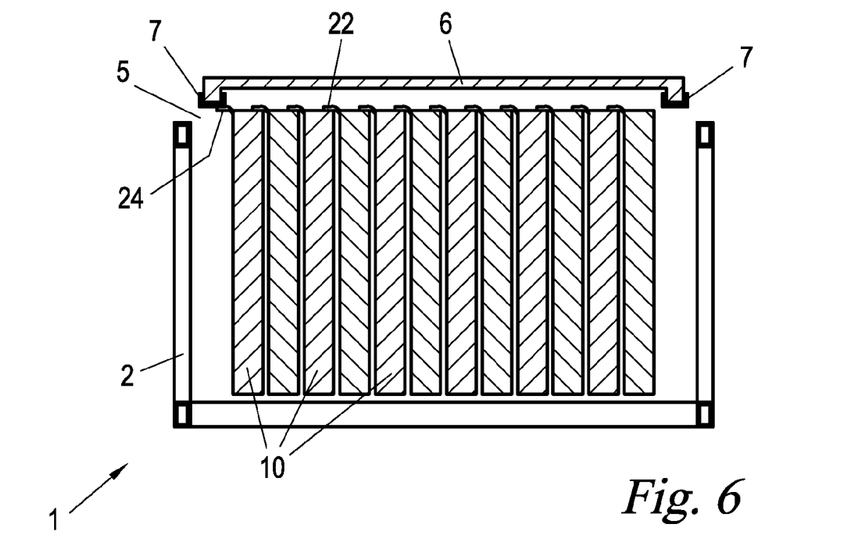
FIG. 6 is a sectional view of the housing and its opening with the sweeping lip for the uppermost solar panel.

A further sweeping lip 24 arranged in the housing 2 can be provided for the uppermost solar panel 10, e.g. on a guide rail 7, see FIG. 6. The sweeping lip 24 sweeps along the uppermost solar panel 10 when the support 3 pivots in and out of the housing 2. Alternatively, the further sweeping lip 24 could also be arranged on the cover 6 and be moved by this over the uppermost solar panel 10 when the cover opens (not shown).

The invention is not restricted to the represented embodiment, but covers all variants and modifications that fall within the framework of the attached claims. For example, instead of pivoting the support 3 could extend in a linear movement out of the housing 2 if this is configured accordingly, e.g. in upright arrangement. Similarly, instead of the sliding cover 6 a folding cover can also be provided, if desired for simplification. Moreover, the solar module 1 is also suited for installation—preferably to be flush on the upper side—into roof terraces or surfaces of land or water crafts, e.g. roofs of caravans and decks of ships.

What is claimed is:

1. A solar module, comprising:
   a housing with a closable opening,
   an elongated support, and
   a plurality of lamellar solar panels which are mounted on said support to pivot around a common axis and are movable, by rotating over one another, between a first position in which they are superposed to be substantially congruent to one another and parallel to the support, and a second position in which, opened out in a fan formation, they lie substantially adjacent to one another around said common axis,
   wherein the support can be extended from a retracted position in which it is received with the solar panels in the first position within said housing, via said opening out of said housing into an extended position in which the solar panels can be moved between their first and second positions.

2. The solar module according to claim 1, wherein the housing has the shape of a shallow box with said opening lying on the upper side thereof, wherein the support is mounted to pivot in the housing and in the retracted position lies parallel to and below the upper side and in the extended position is pivoted through the opening.

3. The solar module according to claim 1, wherein the housing forms a sealed tank for installation into the ground to be flush on the upper side.

4. The solar module according to claim 1, wherein the housing is fitted with elements for installation into a building facade or a building roof to be flush on the upper side.

5. The solar module according to claim 1, wherein the opening is closable with at least one cover that slides approximately parallel to the upper side of the housing.

6. The solar module according to claim 5, wherein the cover forms a shallow plantable tank.

7. The solar module according to claim 5, wherein the cover is fitted with a sweeping lip, which slides along the uppermost of the superposed solar panels when it is opened.

8. The solar module according to claim 1, wherein at least one solar panel is fitted on its rear side with a sweeping lip, which slides along the solar panel below it when opening out in a fan formation.

9. The solar module according to claim 8, wherein each of the plurality of the solar panels is provided with a sweeping lip except for the lowest one.

10. The solar module according to claim 1, wherein the opening of the housing is fitted with a sweeping lip, which slides along the uppermost of the superposed solar panels during extension of the support.

11. The solar module according to claim 1, wherein at its one end the support has a pivot head for mounting the solar panels.

12. The solar module according to claim 11, wherein the pivot head is fitted with a solar altitude-controlled drive for automatic solar tracking of the solar panels.

13. The solar module according to claim 1, wherein the support is fitted with a solar altitude-controlled drive for automatic solar tracking of the solar panels.

14. The solar module according to claim 1, wherein the solar panels are movable between their first and second positions by means of at least one electric drive.

15. The solar module according to claim 14, wherein the electric drive has a worm drive engaging a toothed ring of a driven axis.

16. The solar module according to claim 1, wherein the support is retractable and extensible by means of at least one electric drive.

17. The solar module according to claim 16, wherein the electric drive has a worm drive engaging a toothed ring of a driven axis.

18. The solar module according to claim 1, wherein each solar panel is formed by a planar array of photovoltaic solar cells.

19. A solar module, comprising:
    a housing with a closable opening,
    an elongated support, and
    a plurality of lamellar solar panels which are mounted on said support to pivot around a common axis and are movable between a first position in which they are superposed to be substantially congruent to one another and parallel to the support, and a second position in which, opened out in a fan formation, they lie substantially adjacent to one another around said common axis,
    wherein the support can be extended from a retracted position in which it is received with the solar panels in the first position within said housing, via said opening out of said housing into an extended position in which the solar panels can be moved between their first and second positions, and wherein the opening is closable with at least one cover that slides approximately parallel to the upper side of the housing.

20. A solar module, comprising:
    a housing with a closable opening,
    an elongated support, and
    a plurality of lamellar solar panels which are mounted on said support to pivot around a common axis and are movable between a first position in which they are superposed to be substantially congruent to one another and parallel to the support, and a second position in which, opened out in a fan formation, they lie substantially adjacent to one another around said common axis,
    wherein the support can be extended from a retracted position in which it is received with the solar panels in the first position within said housing, via said opening out of said housing into an extended position in which the solar panels can be moved between their first and second positions, and wherein the opening of the housing is fitted with a sweeping lip, which slides along the uppermost of the superposed solar panels during extension of the support.

21. A solar module, comprising:
    an elongated support;
    an array of solar panels, each solar panel having one end mounted to a common axis at one end of the elongated support, the array of solar panels being movable from a first position in which the panels are stacked one on top of the other to a second position in which each panel rotates over an adjacent panel to form an opened fan formation, wherein each panel lies substantially adjacent to one another around the common axis when in the second position.

22. The solar module according to claim 21, wherein at least one solar panel includes a sweeping lip on its rear side which slides along and cleans a surface of a solar panel below it in the array when moved from the first position to the second position.

23. The solar module according to claim 21, wherein the array is moved from the first position to the second position by driving the uppermost or lowermost panel with an electric drive wherein each panel entrains the panel lying below or above by an entrainment bar.

* * * * *